United States Patent
Cameron et al.

(10) Patent No.: US 7,293,298 B2
(45) Date of Patent: Nov. 13, 2007

(54) SELF-CONTAINED SANITARY SYSTEM FOR A VEHICLE

(75) Inventors: David B. Cameron, Brighton, MI (US); Frank Schagen, Breda (NL); Carrie E. Hall, Jackson, MI (US); Michael B. Fritz, Oconomowoc, WI (US)

(73) Assignee: Thetford Corporation, Ann Arbor, MI (US)

( * ) Notice: Subject to any disclaimer, the term of this patent is extended or adjusted under 35 U.S.C. 154(b) by 199 days.

(21) Appl. No.: 10/817,373

(22) Filed: Apr. 2, 2004

(65) Prior Publication Data

US 2005/0055759 A1     Mar. 17, 2005

Related U.S. Application Data

(60) Provisional application No. 60/460,688, filed on Apr. 4, 2003.

(51) Int. Cl.
*E03D 1/00* (2006.01)
(52) U.S. Cl. .......................................... 4/321; 137/615
(58) Field of Classification Search .................... 4/321, 4/353; 137/615; 222/533, 534
See application file for complete search history.

(56) References Cited

U.S. PATENT DOCUMENTS

| | | | |
|---|---|---|---|
| 779,946 A * | 1/1905 | Link ...................... 137/615 X |
| 4,776,631 A | 10/1988 | Sargent et al. .............. 4/321 X |
| 5,346,245 A | 9/1994 | Budrow et al. ............. 280/655 |
| 6,148,860 A | 11/2000 | Sigler ......................... 137/846 |
| 6,189,161 B1 | 2/2001 | Rijn et al. ..................... 4/321 |

FOREIGN PATENT DOCUMENTS

| | | |
|---|---|---|
| FR | 2.186.049 | 12/1973 |
| GB | 2 310 244 | 8/1997 |
| WO | WO 01/59411 | 8/2001 |

OTHER PUBLICATIONS

European Search Report dated May 8, 1997, 1 pg.

* cited by examiner

*Primary Examiner*—Robert M. Fetsuga
(74) *Attorney, Agent, or Firm*—Harness, Dickey & Pierce, P.L.C.

(57) ABSTRACT

A self-contained sanitary system for a vehicle includes a toilet with a flush tank for storing a source of flush water. The system further includes a spout in fluid communication with the flush tank. The spout has a first open end coupled to the flush tank and a second open end. The spout is coupled for rotation about a generally vertical axis between a stowed position and an access position. The second end is rotatable relative to the first end about a generally horizontal axis between a fill position and a drainage position. The system further includes a bench and a holding tank. The holding tank is removably associated with the toilet and includes a pair of wheels and a retractable handle.

13 Claims, 9 Drawing Sheets

SELF-CONTAINED SANITARY SYSTEM FOR A VEHICLE

CROSS-REFERENCE TO RELATED APPLICATIONS

This application claims the benefit of U.S. Provisional Application No. 60/460,688, filed on Apr. 4, 2003. The disclosure of the above application is incorporated herein by reference.

FIELD OF THE INVENTION

The present invention relates generally to sanitary systems for use in vehicles. More particularly, the present invention relates to a self-contained sanitary system for a vehicle having a removable holding tank.

BACKGROUND OF THE INVENTION

Vehicles, including but not limited to recreational vehicles ("RVs" in the United States and "Caravans" in Europe), tractor trailers, airplanes, boats, trains, and the like, often incorporate sanitation systems for the comfort and convenience of the occupants. In one particular type of known sanitation systems, a removable waste holding tank is adapted for use with a toilet positioned within an interior compartment of a recreational vehicle. Waste is transported by the toilet structure to the holding tank where it is stored. The holding tank can be conveniently removed from the recreational vehicle through an exterior access door and then transported to a waste disposal site for emptying.

To enable the holding tank to accept waste products from the toilet of the sanitary system, a waste holding tank of the above mentioned type generally includes a centrally disposed fill opening located within its top wall. A seal element surrounds the fill opening of the tank and includes an upper portion which seals against an outlet opening of the toilet bowl. So constructed, waste can be easily and sanitarily transferred into the holding tank.

U.S. Pat. Nos. 4,776,631; 4,892,349; 5,031,249; 5,318,275; and 6,189,161, all owned by the assignee of this application, show examples of the self-contained toilet systems of the type including a waste receptacle having a downwardly directed outlet opening and a storage compartment defined and located below the outlet opening along with a waste holding tank removably disposed within the storage compartment. These systems enable the vehicle operator to remove the holding tank from the vehicle through a small door in a wall of the vehicle. U.S. Pat. Nos. 4,776,631; 4,892,349; 5,031,249; 5,318,275; and 6,189,161 are each incorporated by reference as if fully set forth herein.

Waste disposal systems utilizing a removable holding tank have been in extensive use for more than ten years. These systems, such as those described in U.S. Pat. Nos. 4,776,631; 4,892,349; 5,031,249; 5,318,275; and 6,189,161, have proven to be effective and convenient, and have resultantly become popular in the marketplace. Since manufacture of sanitary systems of this type is typically not within the province of RV builders, an entirely self-contained system can be shipped from the sanitary system manufacturer to the RV builder and essentially all that the RV builder has to do is provide a space in which to mount it. In other words, the RV builder does not have to go to the trouble of separately mounting a toilet bowl on the floor, mounting a waste tank under the floor, connecting it to the toilet bowl outlet, or attaching the usual conduits and termination valves to the outside of the holding tank.

Despite the commercial success achieved by known self-contained sanitary systems, a need for continuous improvement in the pertinent art remains.

SUMMARY OF THE INVENTION

It is a general object of the present invention to provide a self-contained sanitary system for a motor vehicle that improves upon the state of the art.

It is another object of the present invention to provide a self-contained sanitary system for a motor vehicle including a holding tank which is more easily transported from the motor vehicle to a waste disposal site.

It is a related object of the present invention to provide a self-contained sanitary system for a motor vehicle including a waste holding tank with wheels and an extendable handle.

It is another object of the present invention to provide a self-contained sanitary system for a motor vehicle that is more easily emptied of flush water for winterization.

It is a related object of the present invention to provide a self-contained sanitary system for a motor vehicle having a pour out spout for a flush water tank that is rotatable about a generally horizontal axis to facilitate emptying of the flush water tank.

It is another object of the present invention to provide a self-contained sanitary system for a motor vehicle having an electronic level indicator.

In one form, the present invention provides a self-contained sanitary system for a vehicle having a toilet with a flush tank for storing a source of flush water. The system further includes a spout in fluid communication with the flush tank. The spout has a first open end coupled to the flush tank and a second open end. The spout is coupled for rotation about a generally vertical axis between a stowed position and an access position. The second end is rotatable relative to the first end about a generally horizontal axis between a fill position and a drainage position.

In another form, the present invention provides a self-contained sanitary system for a motor vehicle. The system includes a bench and a holding tank. The bench includes a toilet. The holding tank is removably associated with the toilet and includes a pair of wheels and a retractable handle.

It is yet another object of the present invention to provide a sanitary system for a motor vehicle including a waste level indicator for electronically monitoring the volume of waste in a removable holding tank.

It is a related object of the present invention to provide a sanitary system for a motor vehicle that provides a flush water indicator for electronically monitoring the volume of flush water in a flush water tank.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
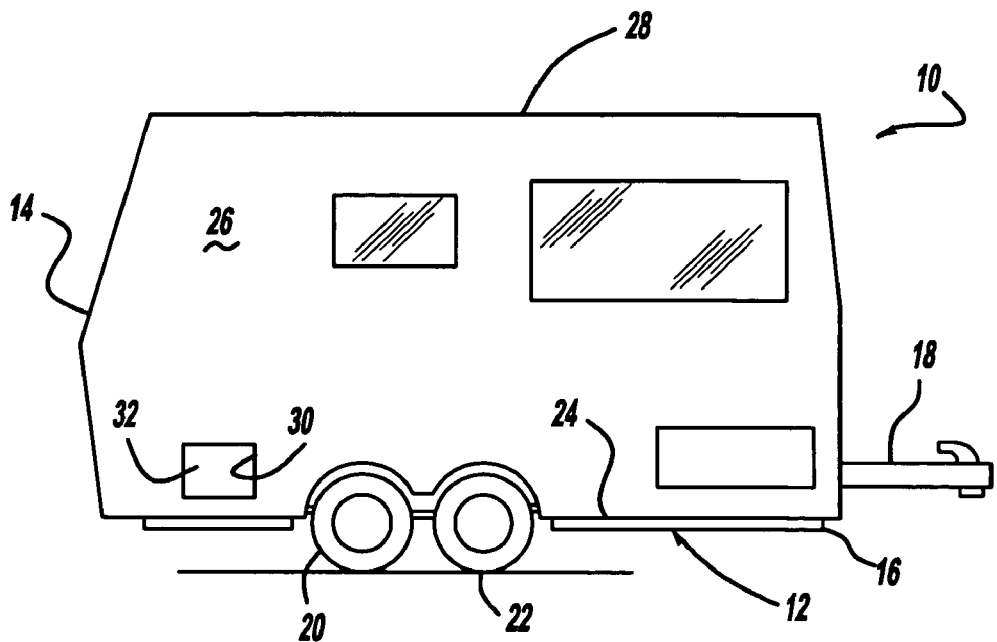
FIG. 1 is an environmental view of an exemplary use application for a self-contained sanitary system for a motor vehicle constructed in accordance with the teachings of a preferred embodiment of the present invention.
Figure 2:
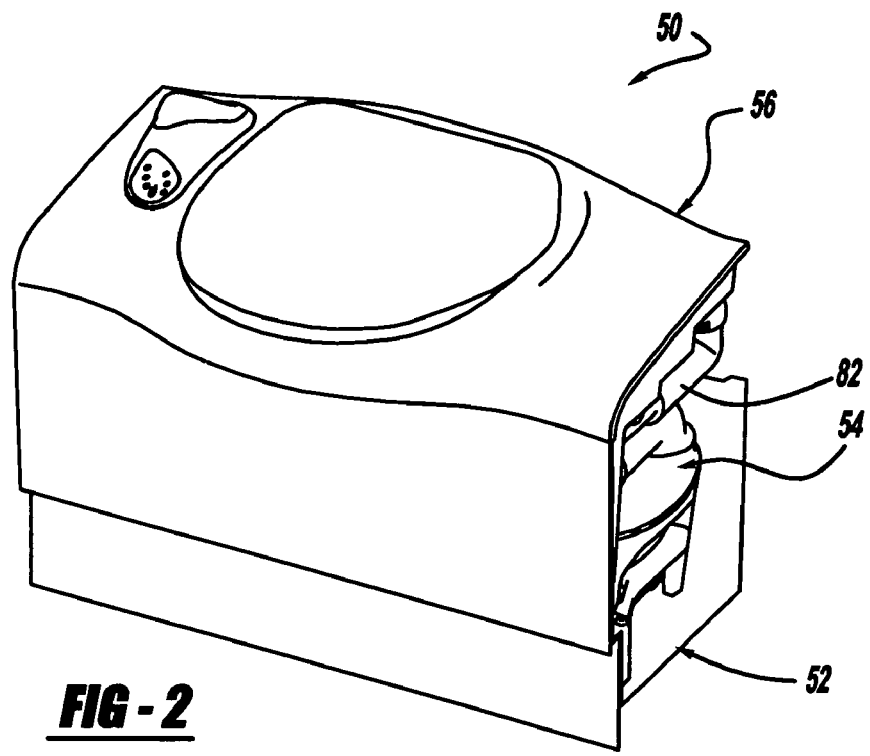
FIG. 2 is a perspective view of the self-contained sanitary system for a motor vehicle of the present invention.
Figure 3:
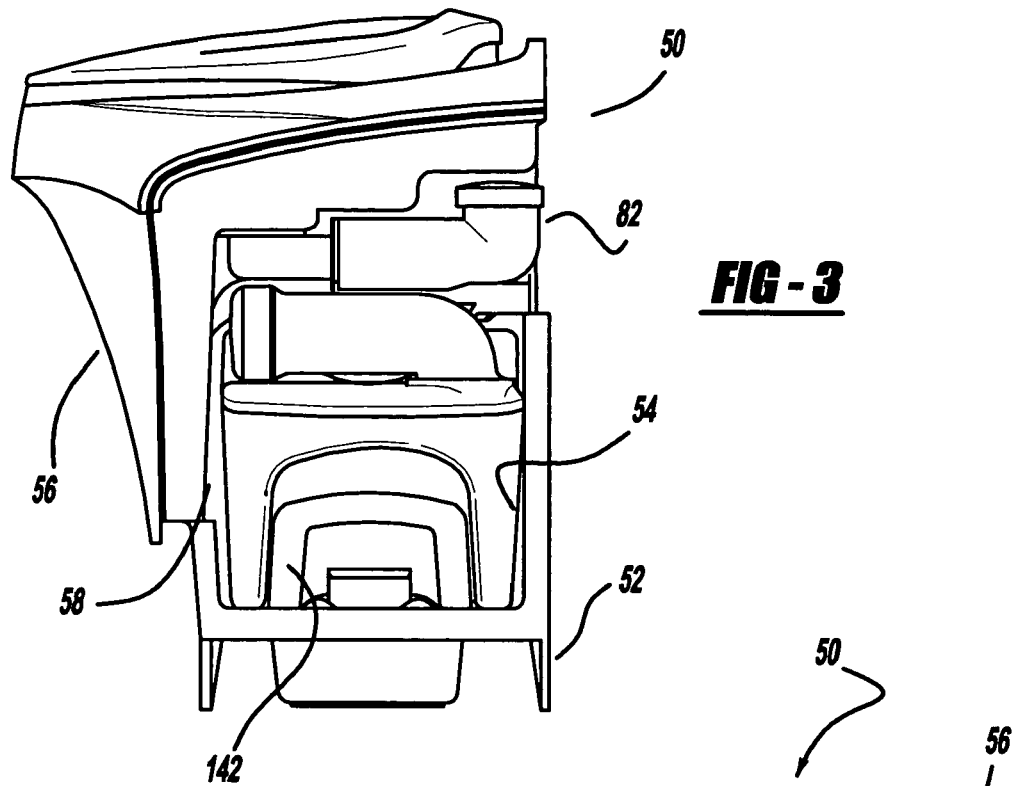
FIG. 3 is a right side view of the self-contained sanitary system for a motor vehicle of the present invention.
Figure 4:
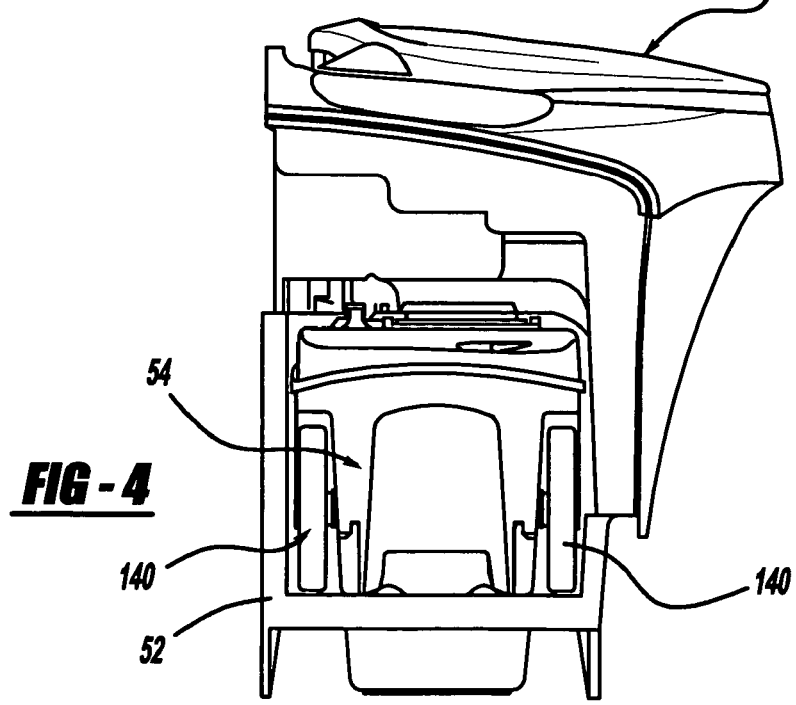
FIG. 4 is a left side view of the self-contained sanitary system for a motor vehicle of the present invention.

With initial reference to FIG. 1, a representative vehicle 10 is illustrated that is particularly adapted to incorporate a self-contained sanitary system according to principles of the present invention. Prior to addressing the details of the sanitary system, a brief understanding of this exemplary use environment is warranted. The vehicle 10 is illustrated as a travel trailer which is adapted to be pulled behind a towing vehicle (not shown). Those skilled in the art will readily appreciate, however, that the various aspects of the present invention are applicable to other types of vehicles. As used herein, the term "vehicle" shall be interpreted to include both self-propelled (i.e., motorized) and towed structure.

The vehicle 10 includes a wheeled chassis 12 on which is supported a vehicle body 14. The chassis 12 includes a perimeter frame 16 having a tongue 18 at the forward end via which the trailer connects to the towing vehicle. The chassis 12 further includes tandem axles 20 and 22 which are supported from the frame 16 by a suitable suspension system (not shown) which may include leaf springs and shock absorbers.

The body 14, in general, includes a floor 24, a vertical sides (one of which is shown at reference character 26), and a roof 28 forming an enclosure. The body 14 is shown to be generally rectangular in shape although it is to be appreciated that any given body may have departures from such a shape. The side 26 is arranged at a right angle to the floor 24 and is provided with a rectangular opening 30. The rectangular opening 30 is shown in FIG. 1 to be closed by a door 32. This opening 30 provides external access to the sanitary system of the present invention when it is disposed within the vehicle body 14.

With continued reference to FIG. 1 and additional reference to FIG. 2 through 13, the self-contained sanitary system according to principles of the invention will be further addressed. The self-contained sanitary system is generally identified in the drawings at reference character 50 and generally is shown to include three major components. These components include a base member 52, a holding tank 54 and a bench section, or seat section, 56. The bench section 56 and the base member 52 are built into the vehicle 10 in any manner well known in the art. Reference in this regard may be made to commonly assigned U.S. Pat. No. 4,776,631. The holding tank 54 is removably stowed between the bench section 56 and the base member 52 in a stowage compartment 58 (see FIG. 3, for example).

In one particular application, the sanitary system 50 is installed in the vehicle 10 such that a user seated on bench 56 faces the rear of the vehicle 10, and for a right-hand installation so that the left hand ends of the components confront the vehicle's right exterior sidewall 26. The motion of the holding tank 54 through opening 30 will therefore be longitudinally of the holding tank 54 and the base member 52 and the bench 56, but transverse relative to the vehicle 10. Similarly the transverse, or lateral dimensions of the bench 56, holding tank 54 and base member 52 will be longitudinally, or front to back, in the vehicle 10. It is to be understood that this particular application and the related terminology is simply for convenience in description and is not to be construed in a limiting sense affecting the scope of the present invention. Indeed, it is entirely possible that bench 56, base member 52, and tank 54 could be alternatively positioned in the vehicle 10 or configured with different shapes such that their longitudinal dimensions might lie fore and aft or at a different angle in the vehicle 10.

Figure 13:
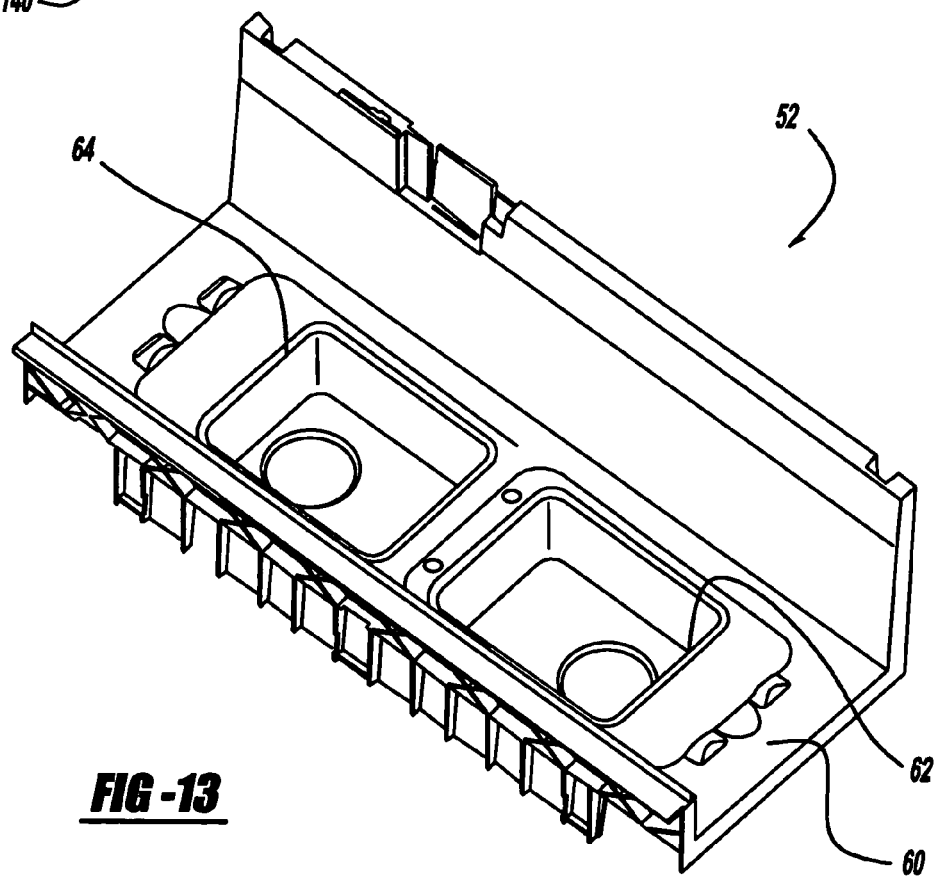
FIG. 13 is a perspective view of a base of the self-contained sanitary system for a motor vehicle of the present invention.

The base member 52 is shown particularly in FIG. 13. It will be understood that a lowest part of the base member 52 is disposed and supported on the vehicle floor 24. A load bearing structure (not shown) provides the principal load bearing support for the holding tank 54 and bench 56. The base member 52 includes a horizontal wall portion 60 disposed on the load bearing structure so that this horizontal wall portion 60 is disposed at a level above floor 24.

Two pans 62 and 64 are formed in base member 52 and in the preferred embodiment are identical and symmetrically disposed to either side of the center of wall portion 60. These pans 62 and 64 have a depth corresponding to the distance of horizontal wall portion 60 above floor 24 so that the bottoms of the pans 62 and 64 are disposed against the floor 24. The pans 62 and 64 provide a place for the stowage of chemical containers. These may be deodorants or the like which are introduced into the holding tank 54. Typically, these chemicals are added after the holding tank 54 has been dumped, rinsed, and filled with a small amount of water. Therefore, when the tank 54 is brought back to the vehicle 10 in such a condition, the chemicals can be introduced. The containers for the chemicals can then be closed and placed back into the pans 62 and 64 in the base member 52. Then the holding tank 54 is reinstalled in the stowage compartment 58. The box frame relieves the load of the tank 54 and bench 56 from these pan structures 62 and 64 enabling base member 52 to be formed as a plastic part by injection molding. The tank 54 is similarly constructed of a suitable plastic material having a reasonably low coefficient of friction so that the tank 54 can be slid into and out of the stowage compartment 58.

Figure 7:
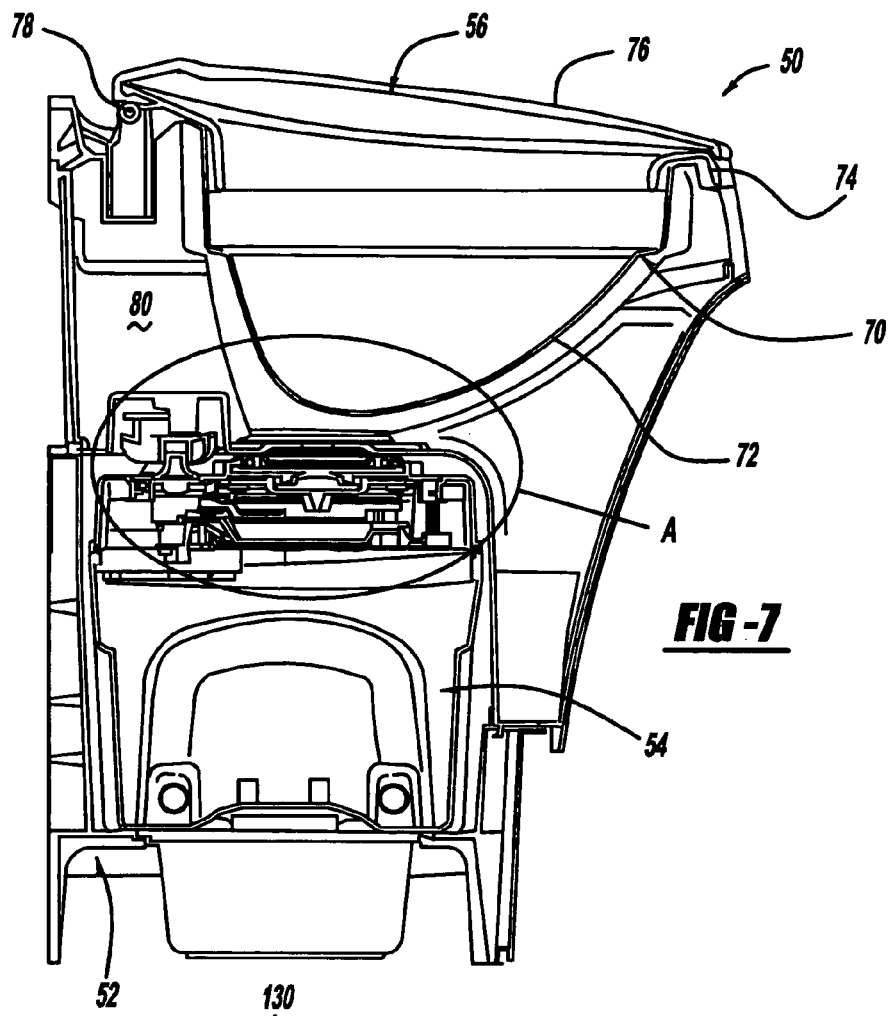
FIG. 7 is a cross-sectional view taken along line 7-7 of FIG. 5.
Figure 8:
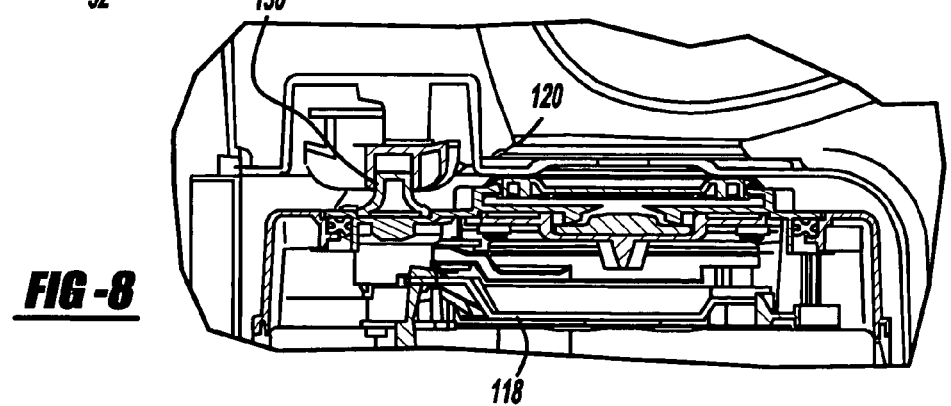
FIG. 8 is an enlarged detail view further illustrating the area A of FIG. 7.
Figure 9:
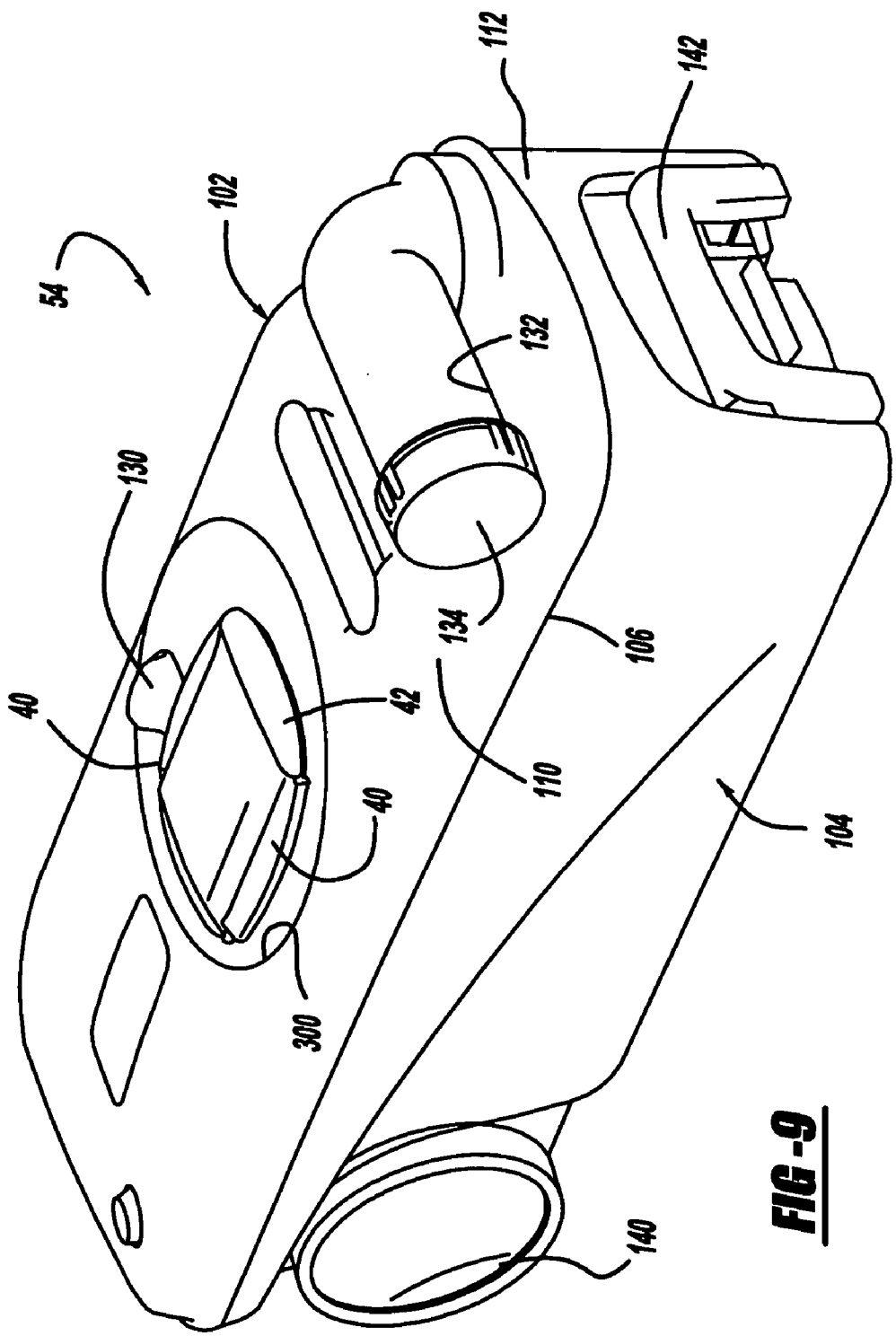
FIG. 9 is a perspective view of the holding tank of the self-contained sanitary system for a motor vehicle of the present invention shown removed from the bench for purposes of illustration.
Figure 10:
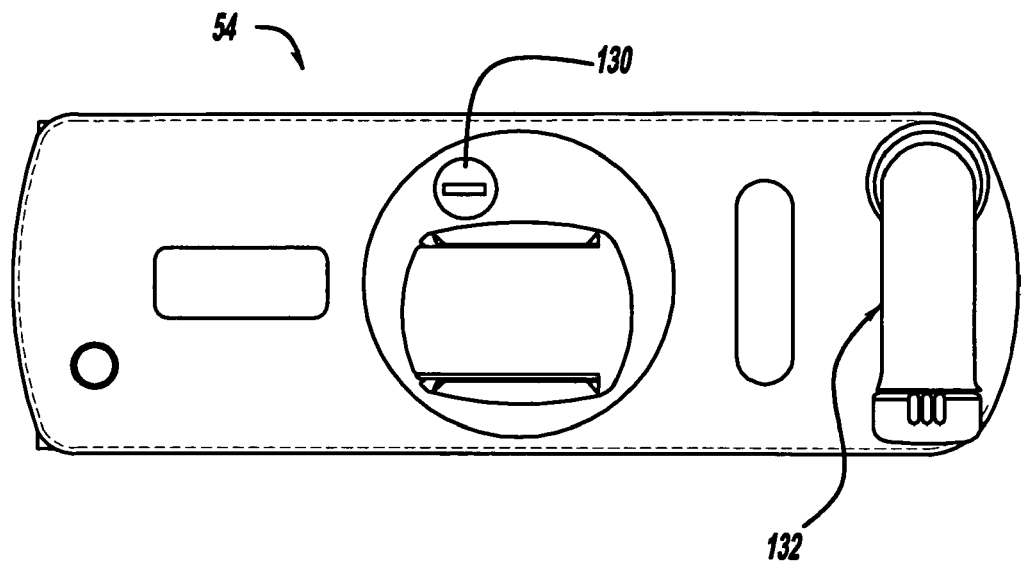
FIG. 10 is a top view of the holding tank of FIG. 9.
Figure 11:
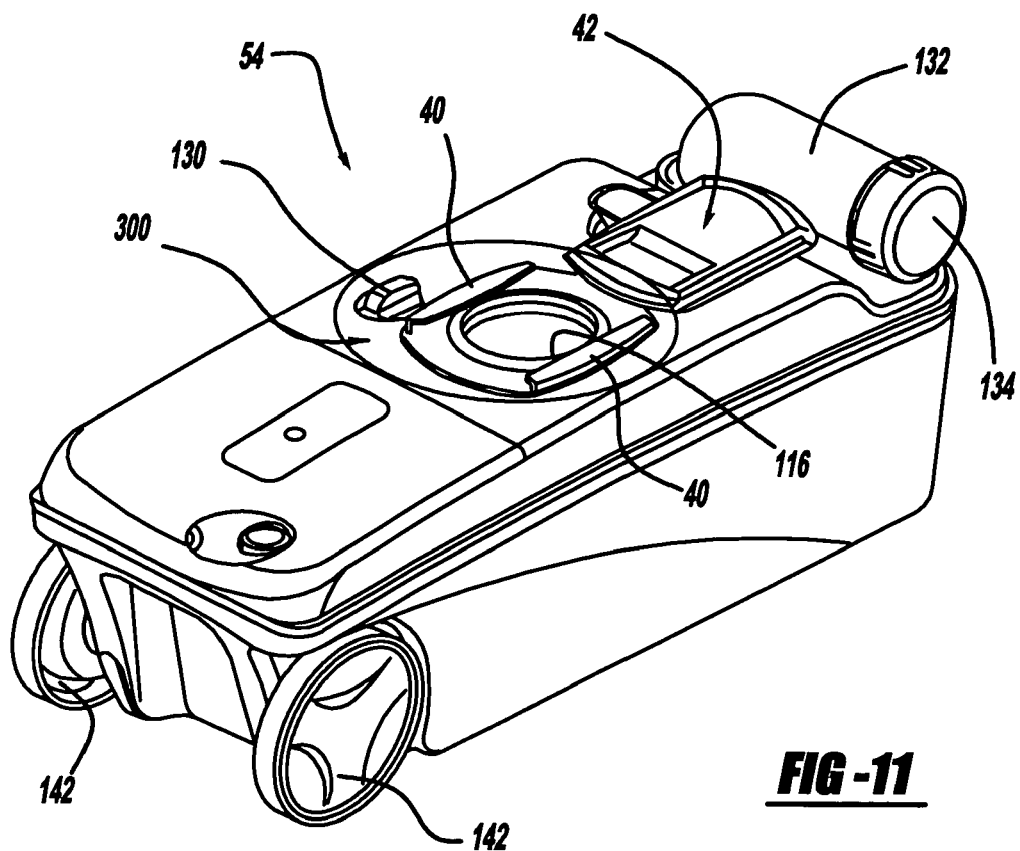
FIG. 11 is another perspective view of the holding tank of FIG. 9, illustrated with a closure plate translated to an open position.

The bench 56 carries a toilet 70 (see FIG. 7, for example). The toilet 70 defines a bowl 72. An associated seat 74 and cover 76 are hingedly mounted on bench 56 adjacent the rear of the bowl 72 for swinging motion about an axis 78 between up and down positions.

The bench 56 includes a flush water storage chamber or tank 80 which surrounds bowl 72. This chamber 80 contains a supply of fresh water for use in flushing of the bowl 72. Operation of the toilet 70 may be electronically or mechanically controlled. The particular manner of control is beyond the scope of the present invention.

The bench 56 is further shown to include a spout 82. The spout 82 provides access from outside the vehicle 10 for filling the flush water tank 80. The spout 82 also provides access from outside the vehicle 10 for emptying the flush water tank 80. Such emptying is often desired to winterize the vehicle 10. The spout 82 and its manner of operation will be described further below.

The holding tank 54 has a generally overall rectangular shape with a top wall 110, a sidewall 112, and a bottom wall 114. The top wall 110 contains a central dome which has a circular opening 116 (see FIG. 11) which is opened and closed by a valve blade 118 within the tank 54. When the tank 54 is stowed within the stowage compartment 58, the opening 116 registers in a sealed manner with the outlet from bowl 72, and the blade 118 controls the passage from the bowl 72 into the holding tank 54. The holding tank opening 116 automatically connects to and disconnects from the toilet bowl outlet 72 in response to movement of the holding tank 54 into and out of the stowage compartment 58.

The holding tank 54 is provided with a pair of rails 40. The rails 40 slidably receive a closure plate 42. The closure plate 42 translates between open and closed positions. The rails 40 cooperate with a structure of the toilet 70 for mechanically aligning the toilet 70 with the tank 54. More details concerning this aspect of the holding tank 54 are provided in commonly assigned U.S. Pat. No. 4,776,631 referenced above.

The blade 118 is operated between an open and a closed position from a knob through a coupling mechanism. A portion of this coupling mechanism that is an actuating member is disposed on the bench 54. A cooperating portion of the coupling mechanism is carried by the holding tank 54. The portion of the mechanism carried by the holding tank 54 comprises an actuated member 130 disposed on the top wall of the holding tank 54 when the holding tank 54 is in the stowed position. In the tank's stowed position, the actuating and the actuated members are operatively connected in a driving relationship whereby motion of the actuating member imparts rotary motion to the actuated member 130 which in turn operates the blade 118. Further details concerning the operation of the blade 118 of the system 50 are generally beyond the scope of the present invention and are sufficiently described in commonly assigned U.S. Pat. No. 4,776,631 referenced above.

The holding tank 54 includes a body fabricated from an upper plastic part 102 and a lower plastic part 104. The parts 102 and 104 are joined together in a sealed manner around a continuous seam 106. In the preferred embodiment, the parts 102 and 104 are Ema-welded. The upper plastic part 102 contains the top wall 110 and an adjacent marginal portion of the sidewall 112. The lower plastic part 104 contains the remainder of sidewall 112 and the entirety of the bottom wall 114. The size and capacity of holding tank 54 are such that it can hold a meaningful amount of waste so that frequent emptying of the tank can be avoided, yet not so large that the tank is overly difficult to remove, transport, and dump by an average adult even if full. In one particular application, the holding tank 54 has a capacity of approximately 4 to 5 U.S. gallons.

The holding tank also includes a rotatable pourspout 132 mounted in a hole (not particularly shown) in the top wall 110. The pourspout 132 has a keyed and sealed engagement with the hole to maintain sealing contact between the spout 132 and the holding tank 54 for all positions of rotation about the axis of the hole, and to prevent separation of the pourspout 132 from the holding tank 54 for all positions of rotation. The pourspout 132 is rotatable between a stowed position and an extended position. In the stowed position, the pourspout 132 overlies a portion of the top wall 110. An end of the spout 132 is shown closed by a removable closure cap 134.

In view of the description thus far, it is believed that the general organization and arrangement of the major components is fairly apparent. They are organized and arranged in a space efficient manner, well suited for recreational vehicle usage; moreover the usual servicing of the toilet, i.e. filling of the water storage chamber, and removal of the holding tank for dumping accumulated waste contents, are performed entirely from the exterior of the RV so that these activities do not take place in or through the interior occupant space. Attention can now be directed to more of the details of the aforementioned components.

One significant feature of the present invention is that an end of the spout 82 can rotate about both a generally horizontal axis and a generally vertical axis. With particular reference to the side view of FIG. 3, the perspective view of FIG. 5 and the cross-sectional view of FIG. 6, the spout 82 of the sanitation system 10 will be further described. The spout 82 is in fluid communication with the flush water tank 80 and comprises a conduit having a first open end 84 coupled to flush water tank 80. This point of connection is below the full fill level of the flush water tank 80.

Figure 5:
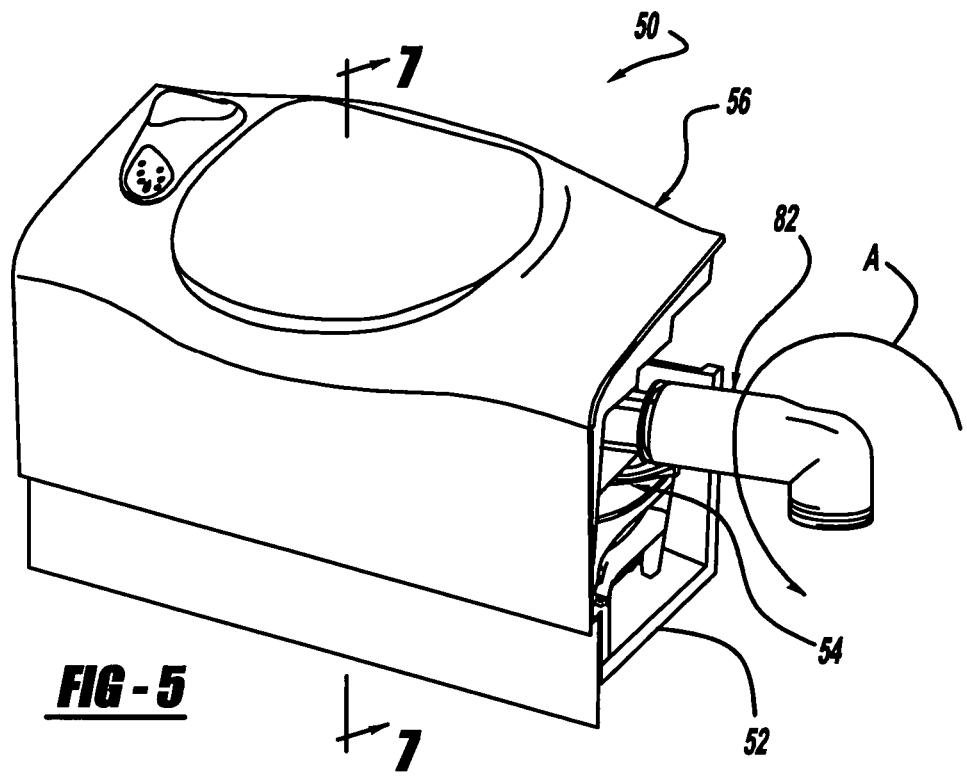
FIG. 5 is a perspective view of the self-contained sanitary system for a motor vehicle similar to FIG. 2, illustrating the pour out spout of the system rotated to an emptying orientation for purposes of emptying the flush water tank.
Figure 6:
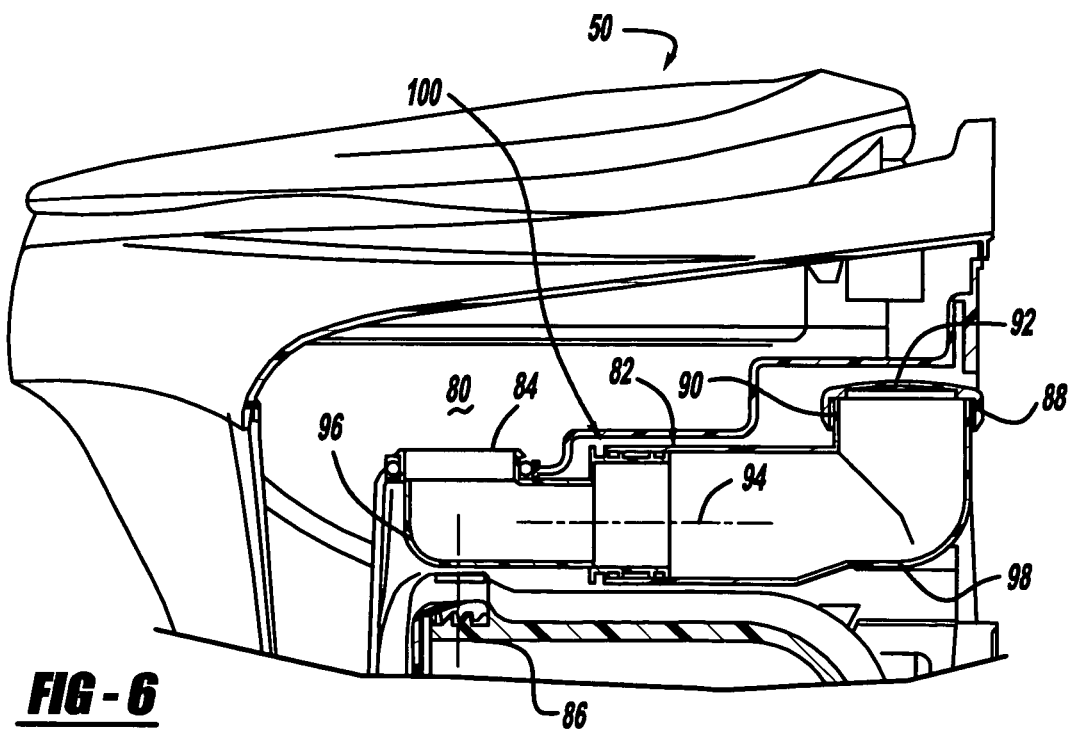
FIG. 6 is a partial view of the self-contained sanitary system for a motor vehicle of the present invention shown in cross-section through the pour out spout.

The first end 84 is coupled to the tank 80 for rotation about a generally vertical axis 86 (see FIG. 6). In this manner, the spout 82 can be rotated from a stowed position (shown in FIGS. 3 and 6, for example) to an access position (shown in FIG. 5, for example). When the spout is to be used, the access door 32 is opened and the spout 82 is rotated about the vertical axis 86 essentially 90 degrees. This extends a circular opening 88 in a second end 90 of the spout 82 through the sidewall 26 where it can be filled from any suitable source of water, usually a hose, after a cap 92 or opening 88 has been opened. The spout 82 has a shape and a configuration compatible with the hinged motion of the spout 82 between stowed and access positions.

In the preferred embodiment, the open end 90 of the spout 82 can be rotated about a generally horizontal axis 94 (see FIG. 6) to facilitate emptying of the tank 80. The conduit which comprises the spout 82 preferably includes a first component 96 and a second component 98. The first and second components 96 and 98 are rotatably coupled at a joint 100. Suitable seals are provided between the first and second components 96 and 98 to prevent water leakage.

When it is desired to drain or empty the tank 80 of water (e.g., for winterization), the access door 32 of the vehicle 10 is opened and the spout 82 is rotated about the generally vertical axis 86 in the manner discussed above. At this time, the second component 98 is rotated in the direction of arrow A (see FIG. 5) relative to the first part 96 from an upright of fill position to a downward or drainage position. The drainage position is shown in FIG. 5. As the open end 90 of the spout 82 is below the opposite end 84, water can thereby be drained from the tank 80.

Another particular feature of the present invention is that the holding tank 54 is particularly adapted to facilitate both removal from the vehicle 10 and transport to a sewage site. As addressed above, in one application, the holding tank 54 has a capacity of approximately 4 to 5 U.S. gallons. While this capacity of a tank may generally be transported by manual lifting and carrying, the preferred embodiment of the present invention improves handling of the tank 54 through the incorporation of a pair of wheels 140 and a retractable handle 142. As will become apparent below, the wheels 140 and the hand 142 cooperate to allow the user to pull the holding tank 54. In this manner, the weight of the holding tank 54 need only be balanced over the wheels 140 as the user pulls the holding tank 54 from the vehicle 10 to a sewage site.

Figure 12:
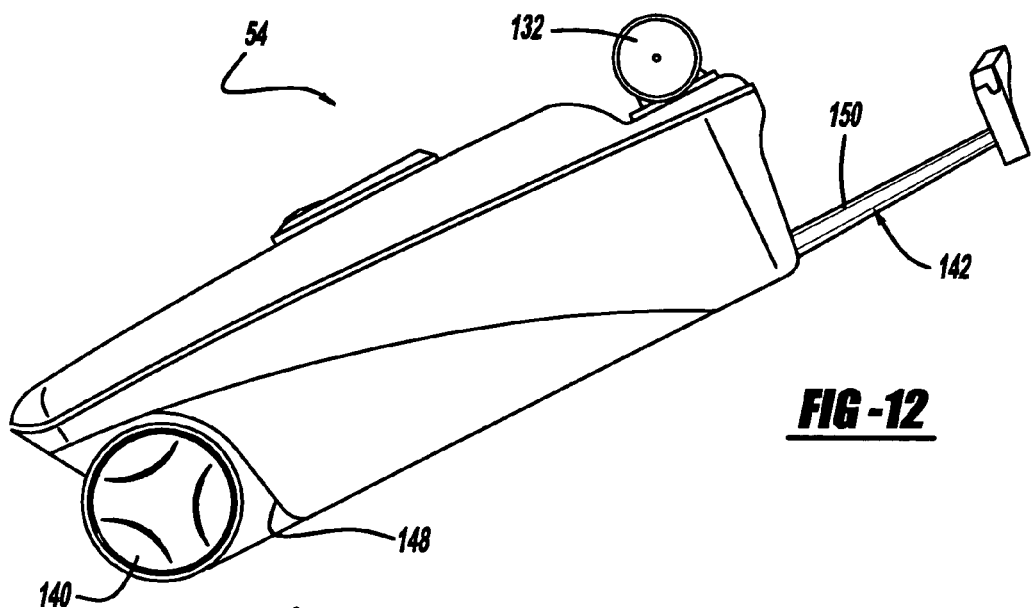
FIG. 12 is a side view of the holding tank of FIG. 9, illustrated with a handle of the holding tank extended and the holding tank oriented for transportation.
Figure 14:
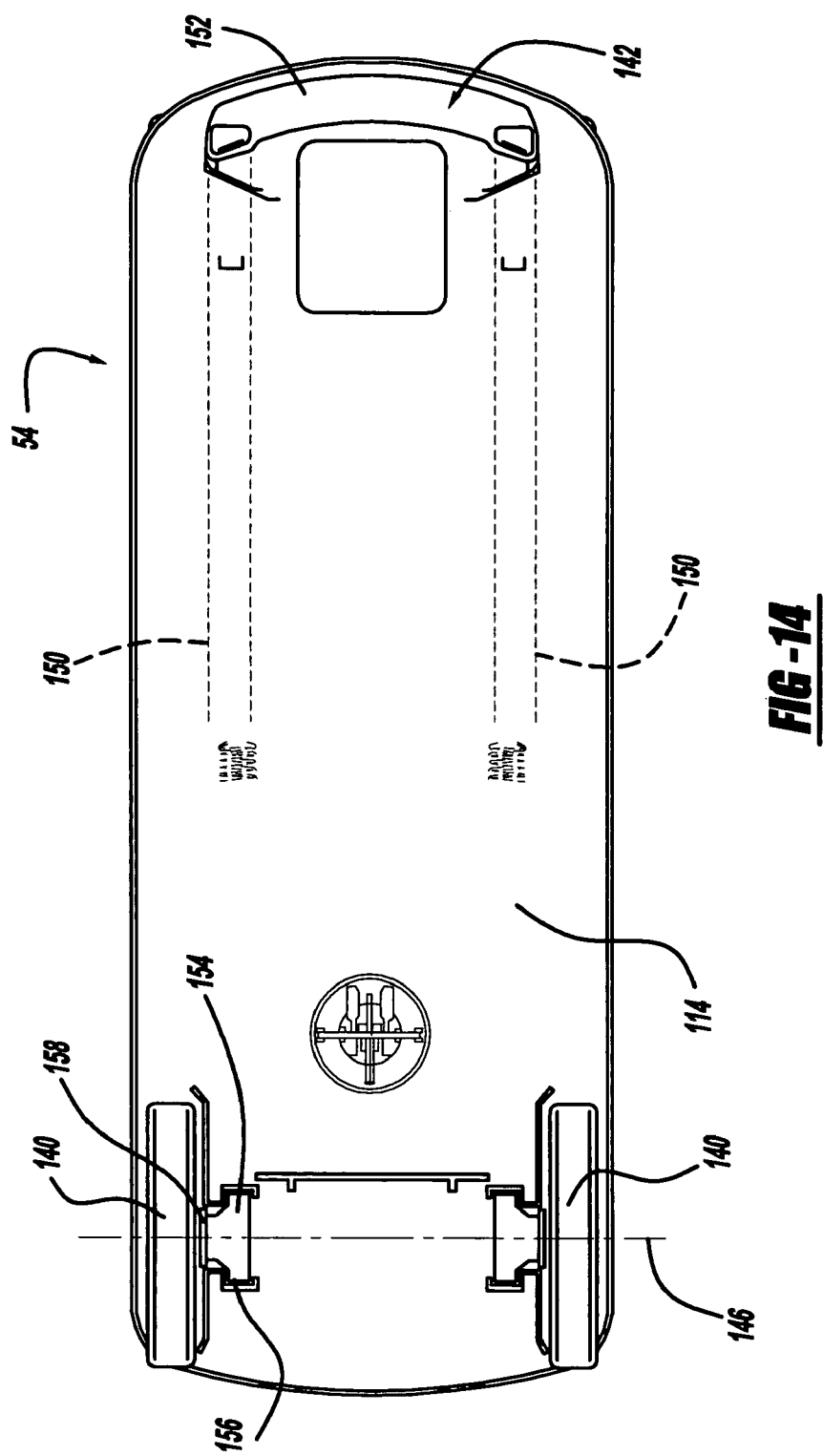
FIG. 14 is a bottom view of the holding tank.

The retractable handle 142 is perhaps best shown in FIGS. 12 and 14. The handle 142 is shown in an extended position in FIG. 12. The handle 142 is shown in a retracted or stowed position in FIG. 14. As noted above, a significant aspect of the present invention relates to a sanitary system that is organized and arranged in an efficient manner. This aspect also applies to the novel design of the wheels 140 and handle 142. As will be addressed, these features not only provide function advantages, they are designed in an efficient manner that does not adversely effect the holding capacity of the tank 54 or the other functional requirements of the system 50.

The wheels 140 are mounted to the holding tank 54 for rotation about a common axis 146. As shown in FIG. 12, the wheels 140 do not forwardly extend beyond the front end of the holding tank 54 and the wheels 140 do not downwardly extend beyond a bottom surface of the holding tank 54. Furthermore, the wheels 140 do not laterally extend beyond the lateral sides of the holding tank 54. As shown, the wheels 140 are positioned in recesses 148 defined in the sidewall of the holding tank. In this manner, the wheels 142 do not interfere with insert into or removal from the holding tank 54 from the stowage compartment 58. Additionally, the wheels 142 only negligible impact the holding capacity of the holding tank 54.

In the preferred embodiment, each of the wheels 140 is connected to the housing of the holding tank 54 through an axle mounting portion 154. The axle mounting portion 154 is nonrotatably received within a slot 156 integrally defined by the holding tank 54. The axle mounting portion 154 rotatably couples to an axle segment 158 which couples with the associated wheel 140. The wheels 140 and their associated interconnection to the holding tank 54 are designed such that failure will not cause a rupture of the cavity defined by the holding 54.

The handle 142 includes two pairs of telescoping members 150 connected by a grab portion 152. The telescoping members 150, in the handle's retracted position, are disposed in channels defined by the holding tank 54. In this manner, the telescoping members 150 do not extend below the bottom surface of the holding tank 54 and thereby do not interfere with a sliding interaction otherwise provided between the bottom of the holding tank 54 and the base member 52. Further in the retracted position, the grab portion 152 does not extend beyond the end of the holding tank.

Yet another particular feature of the present invention relates to a removable access plate 300 of the holding tank 54. The access plate 300, which may be removed from the remainder of the holding tank 54 for cleaning of the holding tank 54, carries the actuated member 130 and also carries the rails 40 and the cover plate 42. The defined aperture 116 which aligns with the toilet 70 is preferably laterally offset from the center of the holding tank 54. The access plate 300 attaches to the remainder of the holding tank 54 through a conventional bayonet arrangement (not specifically shown). The bayonet arrangement allows the access plate 300 to be secured to the remainder of the holding tank 54 into distinct orientations. The first orientation is shown throughout the drawings and is intended for the particular application shown. The second orientation is rotated 180° from the orientation shown in the drawings and is intended for use when the holding tank 54 is to introduced to the storage compartment 58 from the opposite side of the bench 56. In this manner, the holding tank 54 can be introduced from either side with the wheeled end introduced into the storage compartment 58 while still maintaining alignment for the actuated member 130 with the cooperating structure of the toilet 70.

Figure 15:
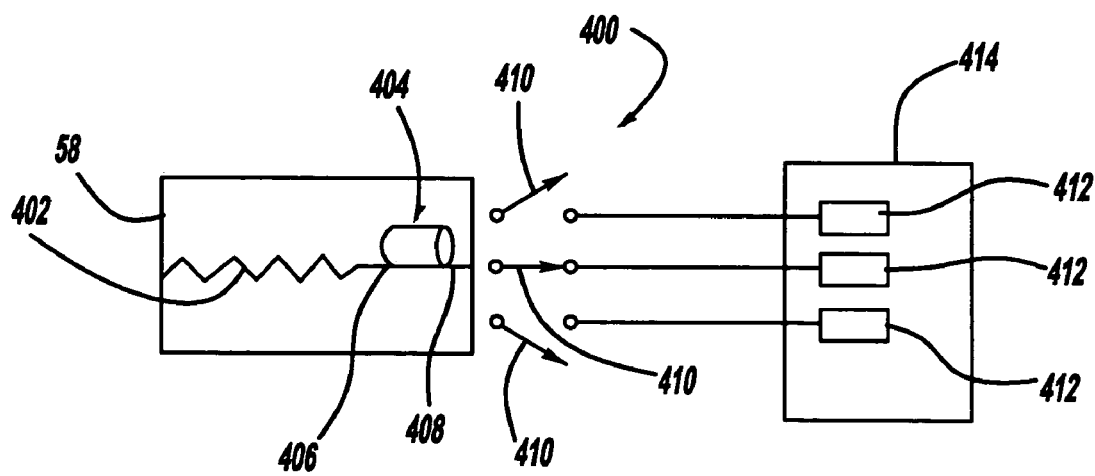
FIG. 15 is a simplified schematic view of a level indicator assembly constructed in accordance with the teachings of the present invention.

Another particular feature of the present invention is the provision of an electronic level indicator for the holding tank 54. As shown in FIG. 15, the present invention includes electronic level monitoring assembly 400 for monitoring the level of waste 402 within the holding tank 54 and the level of flush water within the flush water tank 80. The level indicator assembly 400 for the holding tank 54 includes a float arm 404 having a foam float that rides on the surface of the waste contents and a magnet 408 that is attached to the arm 406. The magnet 408 sends a magnetic signal through the plastic wall of the holding tank 54 to activate a series of electric reed switches 410. The reed switches 410 are placed in a pattern on the outside of the tank 54 that corresponds to a given level of waste in the tank 54 (e.g., 25%, 50%, and 75% full). When a given reed switch 410 is activated by the magnet 408, it completes an electrical circuit and lights a corresponding LED 412 on a control panel 414 carried on top of the bench 56. The series of LEDs 412 lets the user approximate the level of the contents in the holding tank 54 to thereby facilitate emptying prior to the holding tank 54 reaching its capacity. As shown in FIG. 15, the holding tank 54 is 50% full and a center one of the reed switches 416 is closed. The center reed switch 410 controls an LED 412 that indicates the tank 54 is 50% full. The other two reed switches 410 are open.

The present invention also includes a level monitoring assembly for monitoring the flush water level in the tank 80. Compared to the assembly 400, the flush water level indicator assembly functions in a reverse manner but in a structurally similar way and includes a series of reeds that are activated by a magnet disposed within the tank 80. Again, the magnet activates the reed switches for completing an electrical surface to light a corresponding LED. When the water level decreases, the float of the flush water level indicator assembly rides down with it and activates the corresponding LED on the control panel at the top of the bench 50 to let the user know where to approximate the flush water level for the user and allow the user to refill the tank 80 at the appropriate time.

The present invention in its several aspects possesses novel and unique features which have heretofore not been available in self-contained sanitary systems, particularly for recreational vehicles. Access for the usual servicing of the sanitary fixtures is performed entirely from the exterior of the RV through the access opening in the RV sidewall. The functions of filling the water storage chamber in the bench, draining of that chamber, and the removal and installation of the waste holding tank are accomplished through this access opening. The organization and arrangement represents an efficient utilization of available space within a three dimensional envelope within the recreational vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sanitary system comprising:
   a toilet including a flush tank that stores a source of flush water;
   a spout including a first component rotatably coupled to a second component, the first component including a first open end and the second component including a second open end, the first open end in fluid communication with the flush tank, the second component rotatable with respect to the first component about a generally horizontal axis to enable the source of flush water to drain from the flush tank by the second open end; and
   wherein the first component is rotatable about a generally vertical axis defined through the first open end to move the spout between a stowed position and an access position.

2. The sanitary system of claim 1, wherein the second open end is rotatable to a position below the first open end.

3. The sanitary system of claim 1, further comprising a cap removably secured to the second open end.

4. The sanitary system of claim 1, wherein the generally horizontal axis intersects the generally vertical axis.

5. The sanitary system of claim 1, wherein the second component is coupled to the first component to enable the second open end to rotate about the generally horizontal axis between a fill position and a drainage position.

6. The sanitary system of claim 5, wherein the second component is coupled to the first component for rotation about the generally horizontal axis through at least approximately 180°.

7. The sanitary system of claim 1, wherein the second open end faces generally upward in the fill position and faces generally downward in the drainage position.

8. The sanitary system of claim 1, further comprising:
   a bench that encloses the toilet; and
   wherein the spout is stowed within the bench in the stowed position and the spout extends outwardly from the bench in the access position.

9. A sanitary system comprising:
   a toilet including a flush tank that stores a source of flush water; and
   a spout including a first component rotatably coupled to a second component, the first component including a first open end and the second component including a second open end, the first open end in fluid communication with the flush tank, the spout coupled to the flush tank such that the second component of the spout is rotatable about a generally horizontal axis and the first component is rotatable about a generally vertical axis to drain the source of flush water from the flush tank via the second open end; and
   wherein the generally vertical axis is defined through the first open end and the first component is rotatable about the generally vertical axis to move the spout between a stowed position and an access position.

10. The sanitary system of claim 9, wherein the second component is coupled to the first component at a joint to enable the second component to rotate about the generally horizontal axis between a fill position and a drainage position, with the spout draining the source of flush water from the flush tank in the drainage position.

11. The sanitary system of claim 10, wherein the second component is coupled to the first component for rotation about the generally horizontal axis through at least approximately 180°.

12. The sanitary system of claim 10, wherein the second open end faces generally upward in the fill position and faces generally downward in the drainage position.

13. The sanitary system of claim 9, further comprising:
    a bench that encloses the toilet; and
    wherein the spout is stowed within the bench in the stowed position and the spout extends outwardly from the bench in the access position.

* * * * *